United States Patent [19]
Liaw

[11] Patent Number: 5,768,032
[45] Date of Patent: Jun. 16, 1998

[54] LARGE APERTURE PROJECTION LENS

[75] Inventor: Leo Liaw, Taichung, Taiwan

[73] Assignee: Industrial Technology Research Institute, Hsinchu, Taiwan

[21] Appl. No.: 658,037

[22] Filed: Jun. 4, 1996

[51] Int. Cl.$^6$ ..................... G02B 9/20
[52] U.S. Cl. ..................... 359/742; 359/741
[58] Field of Search ............ 359/742, 741, 359/786, 716, 717, 793, 795, 649, 650, 651, 440, 446, 443, 448; 350/206, 227

[56] References Cited

U.S. PATENT DOCUMENTS

| | | | |
|---|---|---|---|
| 3,895,857 | 7/1975 | Imai | 350/227 |
| 4,213,674 | 7/1980 | Momiyama | 350/227 |
| 4,643,536 | 2/1987 | Yamada et al. | 350/422 |
| 4,768,868 | 9/1988 | Wakamiya et al. | 350/463 |
| 4,824,224 | 4/1989 | Fukuda et al. | 350/432 |
| 4,875,763 | 10/1989 | Yamakawa | 350/432 |
| 5,353,156 | 10/1994 | Chung | 359/649 |
| 5,483,382 | 1/1996 | Kappel | 359/786 |
| 5,539,580 | 7/1996 | Kim | 359/649 |
| 5,568,322 | 10/1996 | Azami et al. | 359/689 |
| 5,589,989 | 12/1996 | Estelle et al. | 359/785 |
| 5,621,203 | 4/1997 | Swartz et al. | 235/462 |

Primary Examiner—Frank G. Font
Assistant Examiner—Michael P. Stafira
Attorney, Agent, or Firm—W. Wayne Liauh

[57] ABSTRACT

A large aperture projection lens is disclosed which contains a TESSAR lens set and a FRESNEL lens. The TESSAR lens set consists of four lenses which satisfy the conditions of: $Nd1>1.7$; $Nd2>1.7$; and $33<Ud2<35$. $Nd1$ is the refractive idex of a first lens at the wavelength of 0.5876 um; $Nd4$ is the refractive idex of a fourth lens at the same wavelength; and $Ud2$ is the Abbe number of a second lens. The FRESNEL lens is provided such that the following relationship is observed:

$$0.7 < \frac{F_F}{F_T} < 1.3$$

where Ff is the focal distance of the FRESNEL lens and Ft is the focal distance of the TESSAR lens set. The projection lens satisfies the following requirements while allowing the aperture to be as high as F/2.4. (i) when a color image is projected, the color differential is smaller than 25 um; (ii) the ratio between the brightness at an edge of the image and the brightness at the center of is greater than 60%; (iii) the distortion is smaller than 1%; (iv) the resolution is greater than 50% at 4 lps/mm.

2 Claims, 4 Drawing Sheets

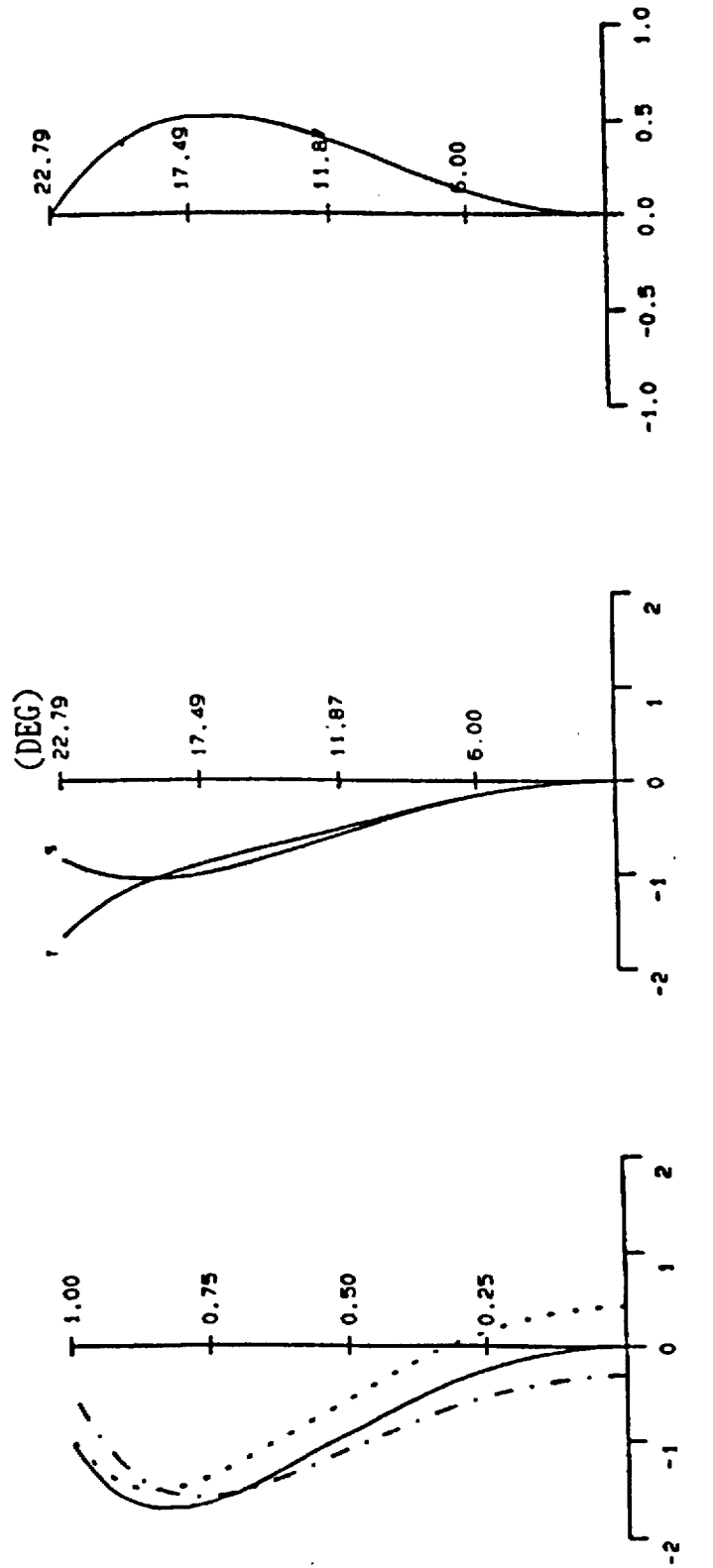

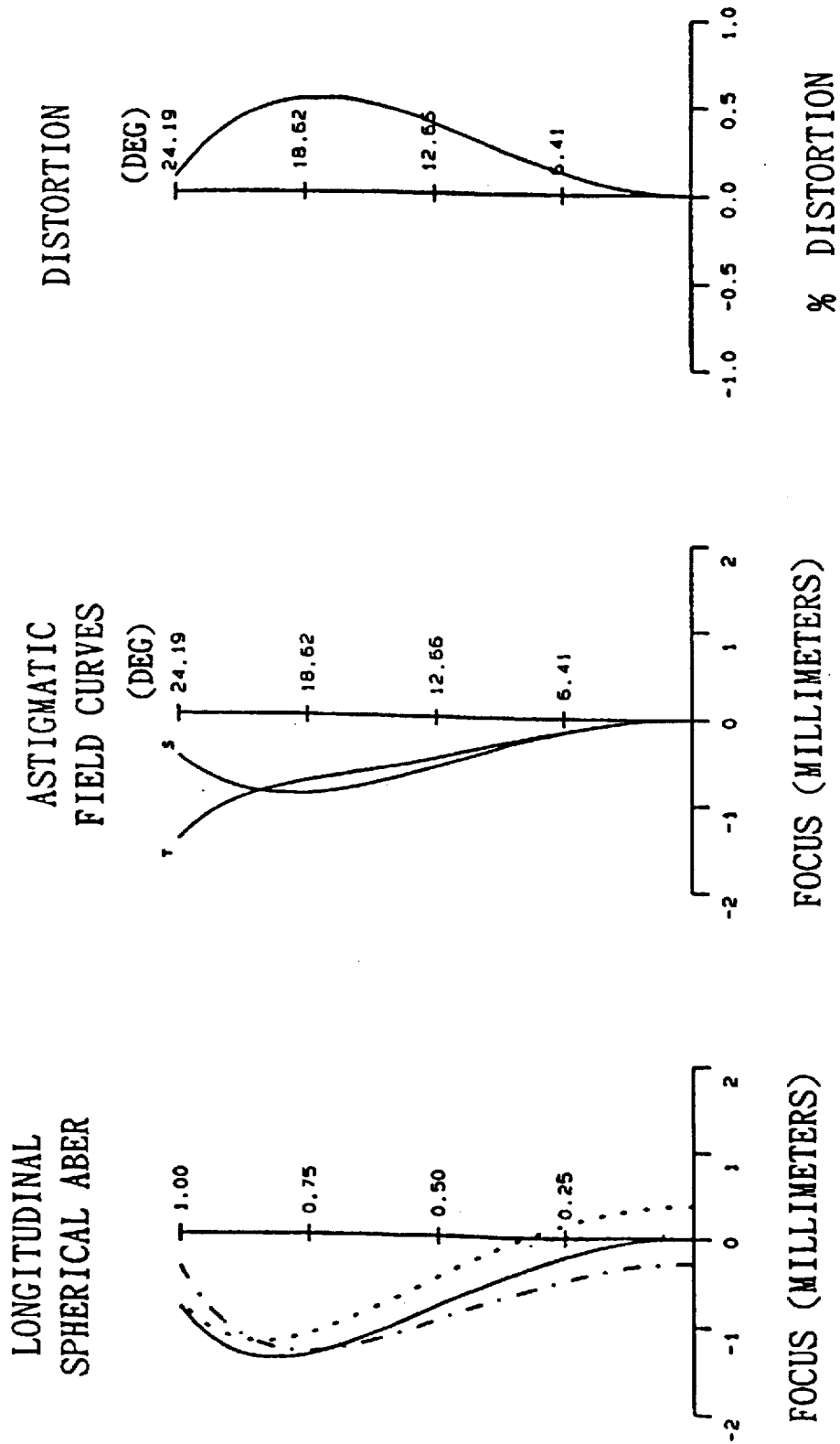

LARGE APERTURE PROJECTION LENS

FIELD OF THE INVENTION

The present invention relates generally to a projection lens, and more particularly to the projection lens having a large aperture.

BACKGROUND OF THE INVENTION

The projection optical system, such as the LCD projection system, is one of the fast-moving and highly sophisticated modern technologies and is capable of merging the computer technology with the video signal. One of the essential elements of the projection optical system is to intensify the brightness of the projected image as well as FLUS of the system by increasing the power of the projection lamp and the aperture of the lens. In the conventional system, the ratio (F/#) of the combination focus and the lens aperture is F/2.8. In other words, the value of F/# is inversely proportional to the lens aperture. The area that is light transmissible is directly proportional to the square of the aperture. As a result, an increase in FLUS can be attained by an increase in the aperture of the lens. In other words, the F/# value must be reduced accordingly.

SUMMARY OF THE INVENTION

It is therefore the primary objective of the present invention to provide a projection optical system with a large aperture projection lens of F/2.4.

It is another objective of the present invention to provide a projection optical system with a large aperture projection lens which is composed of a TESSAR lens set and a nonspherical FRESNEL lens. The FRESNEL lens is a fixed field lens located near the bottom face while the TESSAR lens set comprises three groups of lenses.

It is still another objective of the present invention to provide a projection optical system with a large aperture projection lens enabling the combination focus of the system to be changed along with the projection size by moving the TESSAR lens set in the course of focusing.

The advantages of the present invention are briefly described as follows.

The aperture of the projection lens can be as high as F/2.4.

The image is projected in color, with the color differential being smaller than 25 um.

Ratio of image edge brightness and image center brightness is greater than 60%.

The distortion is smaller than 1%.

The resolution is greater than 50% at 4 lps/mm.

The present invention will be more readily understood upon a thoughtful deliberation of the following detailed description of an embodiment of the present invention in conjunction with the accompanying drawings.

BRIEF DESCRIPTION OF THE DRAWINGS

FIG. 2 shows distortion diagrams of the 20" projected image of the projection lens of the present invention.

FIG. 3 shows distortion diagrams of the 60" projected image of the projection lens of the present invention.

DETAILED DESCRIPTION OF THE EMBODIMENT

Figure 1:
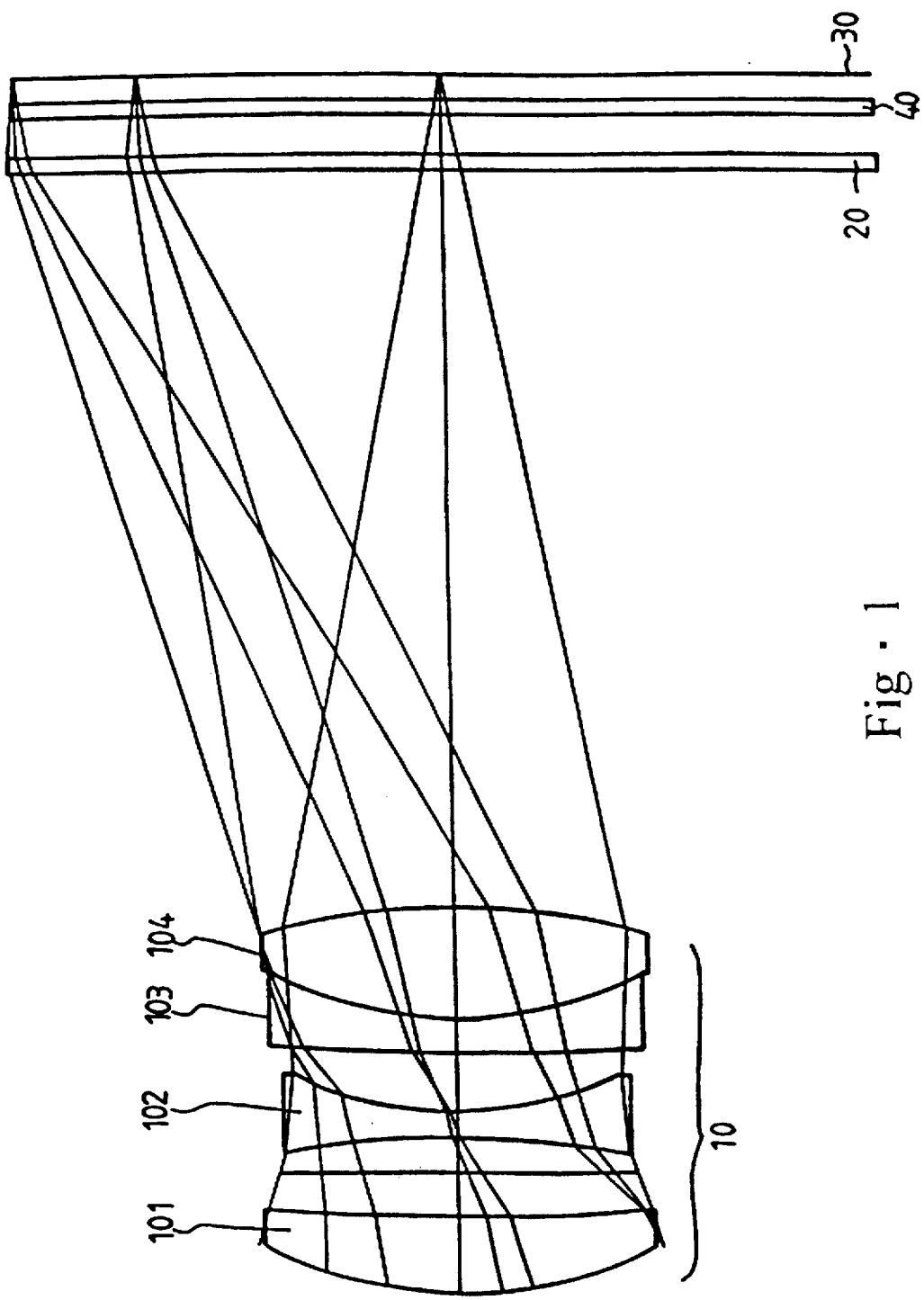
FIG. 1 shows a schematic view of the present invention.
Figure 4C:
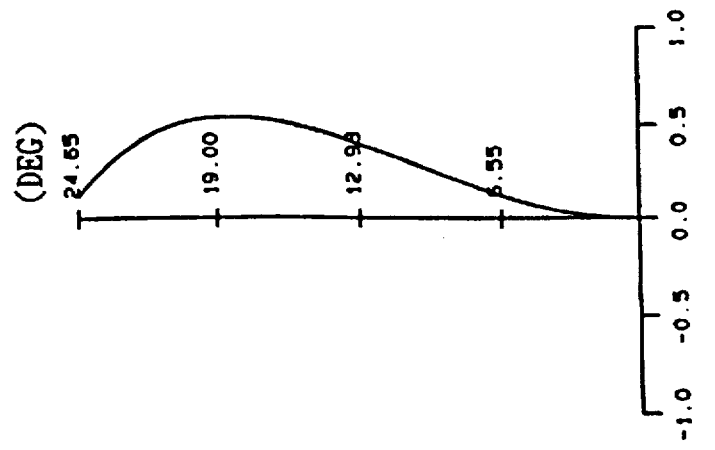
FIG. 4 shows distortion diagrams of the 100" projected image of the projection lens of the present invention.
Figure 4B:
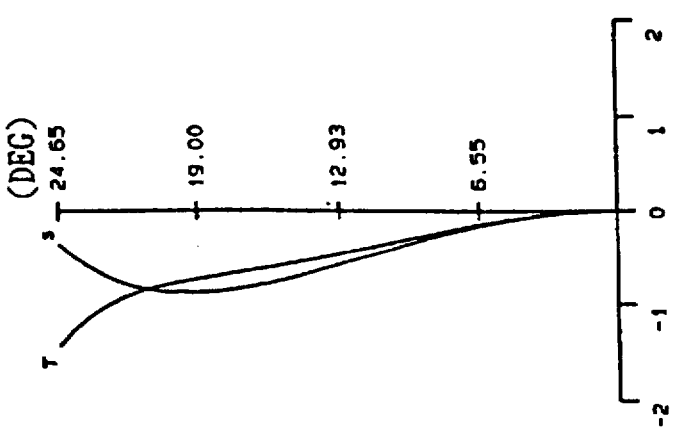
Figure 4A:
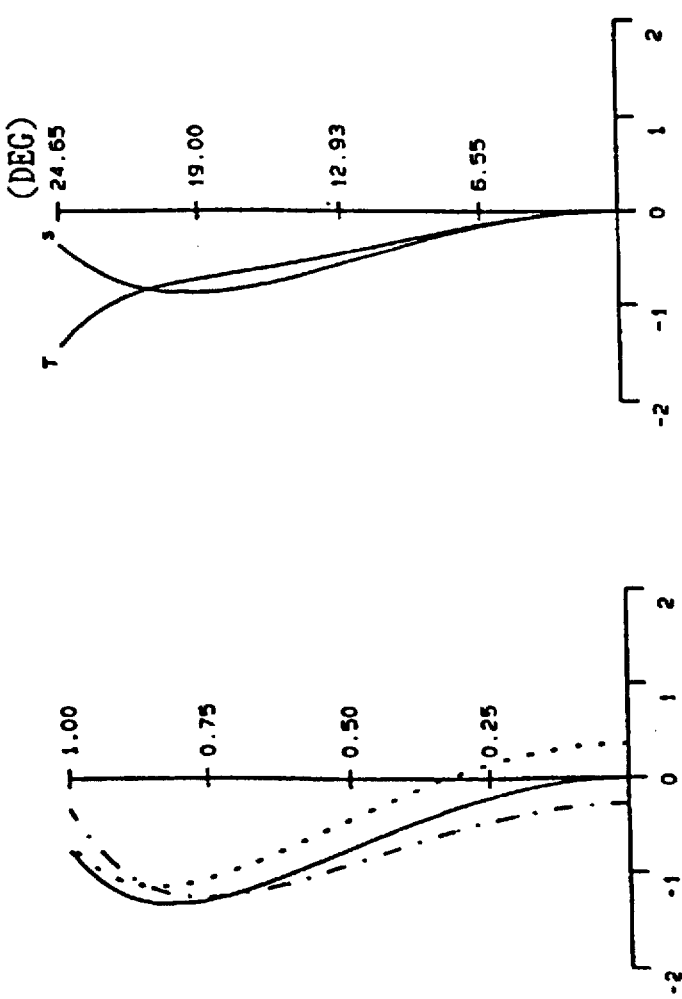

The present invention is composed of a TESSAR lens set 10 and a nonspherical FRESNEL lens 20. The TESSAR lens set 10 comprises a plurality of lenses 101,102,103 and 104; or first, second, third and fourth lenses in the order approaching FRESNEL Lens 20. The lenses 103 and 104 are glued together • The FRESNEL lens 20 is a fixed field lens and is located near a liquid crystal board 30. Located between the FRESNEL lens 20 and the liquid crystal board 30 is a protective glass 40.

The focal relationship between the TESSAR lens set and the FRESNEL lens is expressed by the following formula.

$$0.7 < \frac{Ff}{Ft} < 1.3$$

in which Ff stands for the focal distance of the FRESNEL lens; Ft, the focal distance of the TESSAR lens set.

For correcting the color differential and for increasing the aperture, the selected lenses of the TESSAR lens set are as follows:

Nd1>1.7

Nd4>1.7

Ud2<35 in which Nd1 stands for the refractive index of the NO.1 lens at the wavelength of 0.5876 um; Nd4, the refractive index of the NO.4 lens at the wavelength of 0.5876 um; and Ud2, the Abbe number of the NO.2 lens.

To satisfy the conditions of 0.7<Ff/Ft<1.3 and Nd1>1.7, Nd4>1.7, Ud2<35, the lenses 103 and 104 of the TESSAR lens set are separated as two lenses.

The data obtained in the embodiment of the present invention are as follows:

| Surf | Radius   | Thickness | Glass        |
|------|----------|-----------|--------------|
| 1    | 52.60721 | 10.00     | 1.7433, 49.2 |
| 2    | 432.3881 | 9.86      |              |
| 3    | 116.9987 | 3.50      | 1.6477, 33.8 |
| 4    | 48.35515 | 7.65      |              |
| 5    | 524.1694 | 4.00      | 1.6398, 34.6 |
| 6    | 49.22544 | 15.00     | 1.7440, 44.7 |
| 7    | −76.51684| 93.95     |              |
| 8    | Infinity | 2.10      | 1.4920, 57.4 |
| 9    | −66      | 5.00      |              |

Ff = 132 mm
Ft = 123 mm in which Surf stands for the serial number of the lenses; radius, the curvature radius; thickness, the distance between two lenses; glass, the glass material.

In the embodiment of the present invention, the focal relationship between the TESSAR lens set and the FRESNEL lens is expressed as follows;

$$\frac{Ff}{Ft} = \frac{132}{123} = 1.07 \longrightarrow 0.7 < 1.07 < 1.3;$$

and
Nd1 = 1.7433 > 1.7
Nd4 = 1.744 > 1.7
Ud2 = 33.8 < 35

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A large aperture projection lens comprising a TESSAR lens set and a FRESNEL lens which is a fixed field lens and is located near a bottom lens face, wherein (a) said TESSAR lens set consists of, in the order approaching said FRESNEL lens, first, second, third, and fourth lenses, which satisfy the following conditions:

Nd1>1.7,

Nd2>1.7,

33<Ud2<35, in which Nd1 stands for a refractive idex of said first lens at the wavelength of 0.5876 um; Nd4 stands for a refractive idex of said fourth lens at the wavelength of 0.5876 um; and Ud2, an Abbe number of said second lens, and said third lens is a plano-convex lens with its plano surface facing said second lens;

(b) said FRESNEL lens is provided such that the following relationship is observed:

$$0.7 < \frac{Ff}{Ft} < 1.3$$

in which Ff is the focal distance of said FRESNEL lens and Ft is the focal distance of said TESSAR lens set;

(c) said projection lens satisfies the following requirements while allowing the aperture to be at least F/2.4, wherein F is the overall focal distance of said projection lens;

(i) when a color image is projected, the color differential is smaller than 25 um;

(ii) the ratio between the brightness at an edge of the image and the brightness at the center of is greater than 60%;

(iii) the distortion is smaller than 1%;

(iv) the resolution is greater than 50% at 4 lps/mm.

2. The large aperture projection lens as defined in claim 1, wherein said TESSAR lens set comprises a NO.3 lens and a NO.4 lens, which may be adhered together or separated from each other.

* * * * *